(12) United States Patent  
Lake et al.

(10) Patent No.: US 6,564,631 B1
(45) Date of Patent: May 20, 2003

(54) DIGITAL SIGNAL FUEL SENSOR

(75) Inventors: Victor R. Lake, Davison, MI (US); Susan P. Tyndall, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/126,648

(22) Filed: Apr. 19, 2002

(51) Int. Cl.[7] .............................. G01F 23/60; B60Q 1/00
(52) U.S. Cl. ..................... 73/313; 340/450.02; 340/456
(58) Field of Search .................. 73/313, 314; 340/456, 340/450, 450.02, 624

(56) References Cited

U.S. PATENT DOCUMENTS

| | | | | |
|---|---|---|---|---|
| 2,776,568 A | * | 1/1957 | Ward et al. ..................... 73/255 |
| 3,549,868 A | * | 12/1970 | Watson et al. ................. 377/49 |
| 3,918,306 A | * | 11/1975 | Maltby ....................... 73/304 C |
| 4,050,295 A | * | 9/1977 | Harvey ......................... 73/114 |
| 4,073,186 A | * | 2/1978 | Erwin, Jr. ..................... 73/114 |
| 4,083,248 A | * | 4/1978 | Maier ....................... 73/304 C |
| 4,102,191 A | | 7/1978 | Harris |
| 4,296,472 A | * | 10/1981 | Sarkis ......................... 702/52 |
| 4,557,144 A | | 12/1985 | Lucchini |
| 4,882,572 A | * | 11/1989 | Lippmann et al. .......... 340/456 |
| 5,051,719 A | | 9/1991 | Gaston et al. |
| 5,275,044 A | | 1/1994 | Riley |
| 5,345,398 A | | 9/1994 | Lippmann et al. |
| 5,406,843 A | | 4/1995 | Hannan et al. |
| 5,408,418 A | | 4/1995 | Lippmann et al. |
| 5,435,181 A | | 7/1995 | Koebernik |
| 5,561,416 A | * | 10/1996 | Marshall et al. ............. 370/456 |
| 5,613,399 A | | 3/1997 | Hannan et al. |
| 5,743,136 A | | 4/1998 | Gaston et al. |
| 5,875,413 A | | 2/1999 | Vinci |
| 6,138,508 A | | 10/2000 | Hannan et al. |

* cited by examiner

Primary Examiner—Daniel S. Larkin
Assistant Examiner—Katina Wilson
(74) Attorney, Agent, or Firm—Vincent A. Cichosz

(57) ABSTRACT

A digital signal fuel sensor includes a digital sensor and a wiper assembly for rotation relative to the digital sensor. The digital sensor has a plurality of sensing portions having at least one conductive segment thereon forming a fuel level portion. The wiper assembly also includes a plurality of contact arms extending toward the digital sensor for contacting the sensing portions of the digital sensor as the wiper assembly rotates to produce a binary output.

20 Claims, 3 Drawing Sheets

DIGITAL SIGNAL FUEL SENSOR

TECHNICAL FIELD

The present invention relates generally to fuel tanks for vehicles and, more particularly, to a digital signal fuel sensor for a fuel tank of a vehicle.

BACKGROUND OF THE INVENTION

It is known to provide a fuel tank in a vehicle to hold fuel to be used by an engine of the vehicle. It is also known to provide a fuel sensor in the fuel tank to sense the level of fuel in the fuel tank. Typically, the fuel sensor includes a ceramic card or variable resistor operatively connected to structure of a fuel delivery module and a wiper assembly pivotally connected to the structure for engaging the variable resistor. The wiper assembly has one end connected to a float to rotate the wiper assembly relative to the variable resistor based on a level of fuel in the fuel tank. The wiper assembly has another end with either single or multiple contact loops extending toward the variable resistor and contacts on the contact loops to engage conductive inks on the variable resistor.

Typically, the fuel sensors are analogue devices that measure fuel height or fuel level through a position change by a float arm that is connected to the fuel sensor. The position change is a change in resistive measurement by the fuel sensor to indicate a change in the fuel level. The current fuel sensors suffer from two main disadvantages, which current methods try to balance. Those disadvantages are physical wear and noisy electrical signals. The physical wear occurs when the conductive inks are rough and the loading on the wiper assembly is heavy. Noise occurs when the loading on the wiper assembly is light and a good electrical contact cannot be made. This poor electrical connection between the contacts of the wiper assembly and the ink are the result of an oxidized layer or contaminant build up layer on the ink. This buildup results in a varying circuit resistance and produces unwanted electrical noise.

Therefore, it is desirable to provide a fuel sensor that has a digital switching device. It is also desirable to provide a fuel sensor that incorporates digital switching to eliminate noise. It is further desirable to provide a fuel sensor that changes the ceramic card to incorporate digital switching.

SUMMARY OF THE INVENTION

It is, therefore, one object of the present invention to provide a new fuel sensor for a fuel tank.

It is another object of the present invention to provide a digital signal fuel sensor that incorporates a digital switching device into a digital to analogue decoder.

To achieve the foregoing objects, the present invention is a digital signal fuel sensor including a digital sensor and a wiper assembly for rotation relative to the digital sensor. The digital sensor has a plurality of sensing portions having at least one conductive segment thereon forming a fuel level portion. The wiper assembly also includes a plurality of contact arms extending toward the digital sensor for contacting the sensing portions of the digital sensor as the wiper assembly rotates to produce a binary output.

One advantage of the present invention is that a digital signal fuel sensor is provided for a fuel tank of a vehicle, producing a digital binary output to represent the angular deflection of the fuel sensor. Another advantage of the present invention is that the digital signal fuel sensor eliminates noise from the ceramic card and permits optimum contact loading and ink surface for maximum wear. Yet another advantage of the present invention is that the digital signal fuel sensor incorporates digital switching, which is not sensitive to electrical noise as it is represented as a zero (signal low) or a one (signal high), and an electrical signal present in any form with or without noise will be represented as a one (signal high). Still another advantage of the present invention is that the digital signal fuel sensor reduces cost because special rare metal inks are not necessary. A further advantage of the present invention is that the digital signal fuel sensor provides greater resolution and design flexibility. Yet a further advantage of the present invention is that the digital signal fuel sensor reduces vehicle warranty costs by reducing electrical noise and reduced physical wear.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
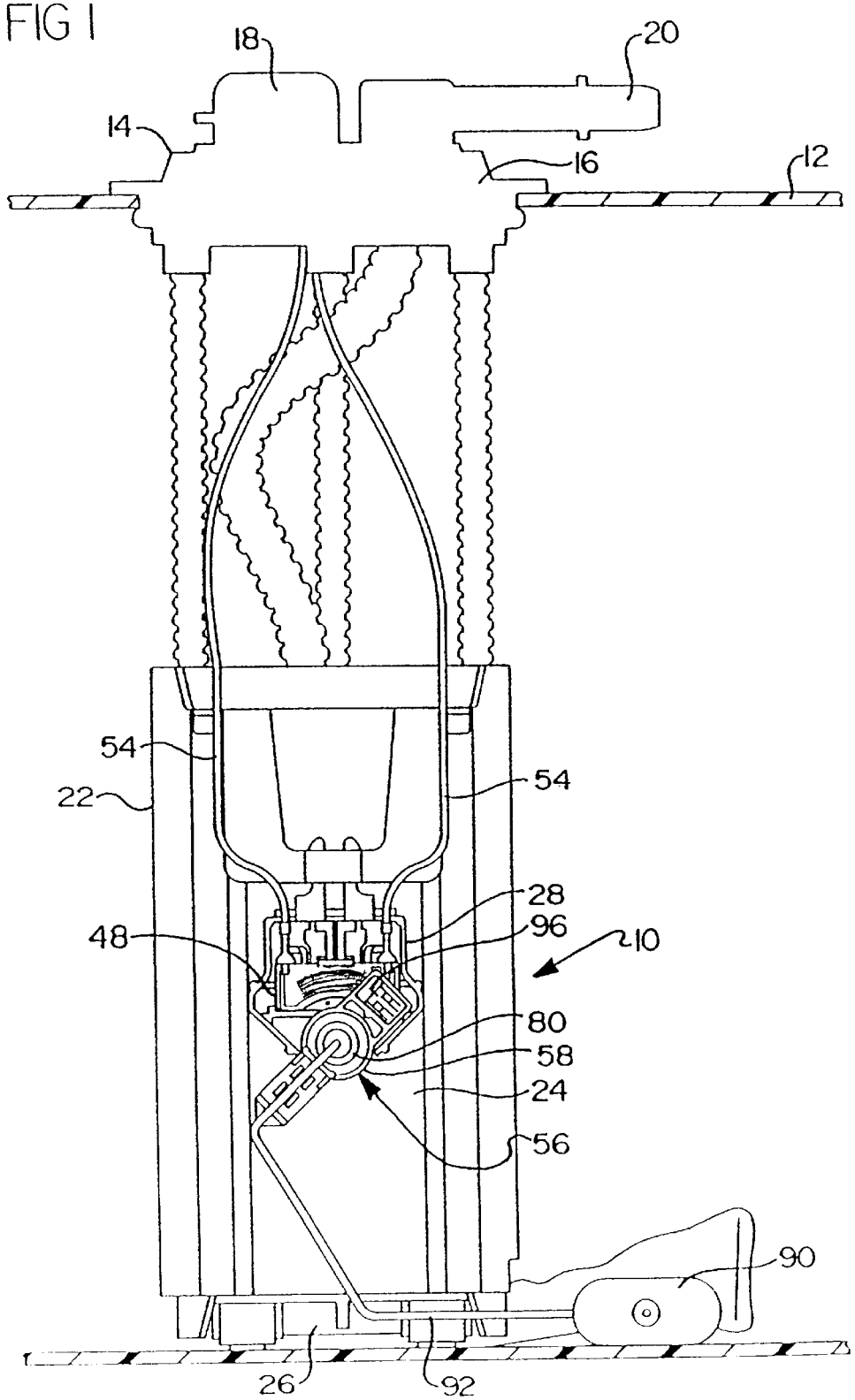
FIG. 1 is a fragmentary elevational view of a digital signal fuel sensor, according to the present invention, illustrated in operational relationship with a fuel tank for a vehicle.
Figure 2:
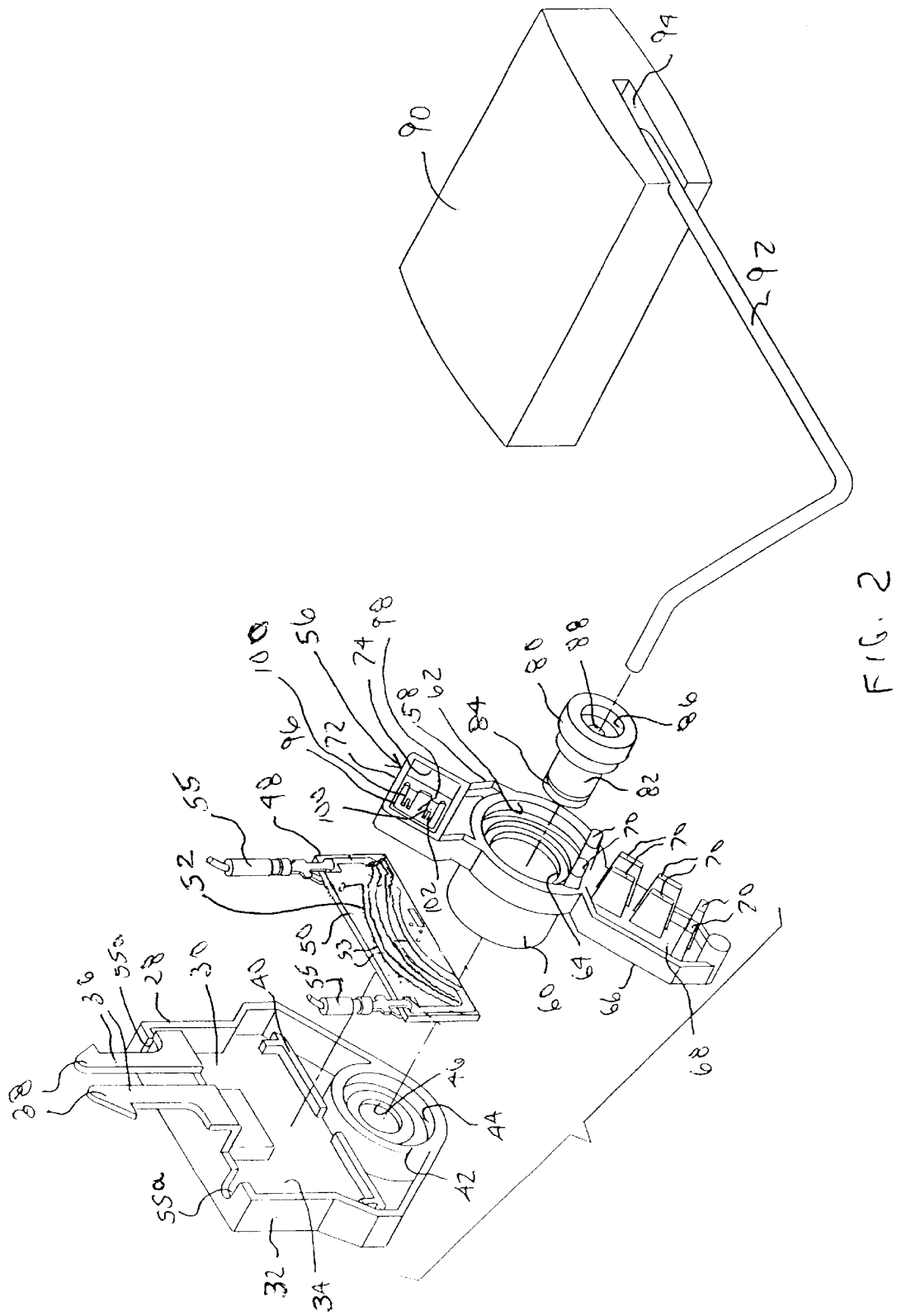
FIG. 2 is an exploded perspective view of the digital signal fuel sensor of FIG. 1.

Referring to the drawings and in particular FIGS. 1 and 2, one embodiment of a digital signal fuel sensor 10, according to the present invention, is shown for a fuel tank 12 (partially shown) of a vehicle (not shown). The fuel tank 12 includes a fuel delivery module 14 therein with a removable cover 16 sealed to the top of the fuel tank 12 having an electrical connector 18 and a fuel line outlet connector 20. The fuel delivery module 14 also includes a fuel reservoir 22 that contains an electrical fuel pump 24 with an inlet 26 and the digital signal fuel sensor 10 to indicate fuel level in the fuel tank 12. It should be appreciated that, except for the digital signal fuel sensor 10, the fuel tank 12 and fuel delivery module 14 are conventional and known in the art.

Referring to FIGS. 1 and 2, the digital signal fuel sensor 10 includes a sensor housing 28 for connection to the fuel reservoir 22. The sensor housing 28 has a base wall 30 and a side wall 32 generally perpendicular to the base wall 30 to form a chamber 34. The sensor housing 28 also has a pair of arms 36 spaced laterally and extending longitudinally from the side wall 32. The arms 36 have a flange 38 extending laterally from a free end thereof. The arms 36 extend through apertures (not shown) in the fuel reservoir 22 and the flanges 38 prevent removal of the arms 36 from the apertures to suspend the sensor housing 28 from the fuel reservoir 22. It should be appreciated that the arms 36 and flanges 38 provide a snap-in feature for the sensor housing 28.

The sensor housing 28 also includes a support wall 40 extending laterally across the chamber 34 and generally perpendicular to the base wall 30 to support a variable resistor 48 to be described. The sensor housing 28 includes a cavity wall 42 extending generally perpendicular to the base wall 30 and connected to the. side wall 32 to form a cavity 44. The cavity wall 42 is generally arcuate in shape to form a generally circular shape for the cavity 44. The sensor housing 28 also has an aperture 46 extending through the cavity 44. The sensor housing 28 is made of a plastic material and formed as a monolithic structure being integral, unitary and one-piece. It should be appreciated that the sensor housing 28 is conventional and known in the art.

Figure 3:
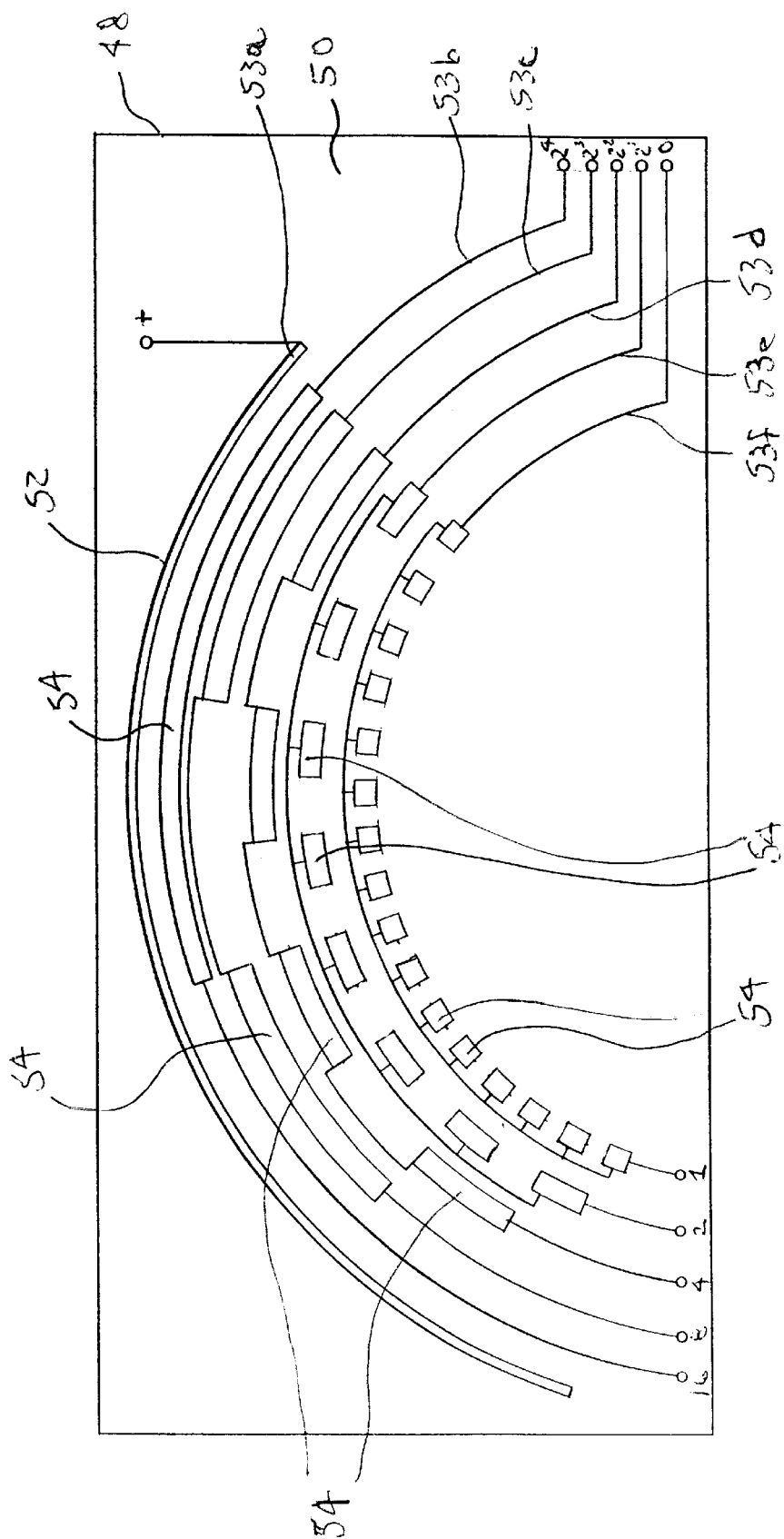
FIG. 3 is a plan view of a digital sensor of the digital signal fuel sensor of FIGS. 1 and 2.

Referring to FIGS. 1 through 3, the digital signal fuel sensor 10 also includes a digital sensor 48 operatively connected to the sensor housing 28. The digital sensor 48 has a circuit card portion 50 and a conductive fuel level portion 52. The conductive fuel level portion 52 extends over a predetermined angle, for example approximately sixty-five degrees (65°), to provide a digital signal output corresponding to the fuel level in the fuel tank 12. The card portion 50 is generally planar and rectangular in shape and made of a ceramic material. The conductive fuel level portion 52 is made of a conductive ink disposed on the card portion 50. The conductive ink is of a type known as in the art. The conductive fuel level portion 52 includes a plurality of concentrically disposed arcuate shaped sensing portions 53a,53b,53c,53d,53e,53f having a common centerpoint. The outermost sensing portion 53a is connected by wires 55 to a positive pole of a source of electrical current (not shown). The outermost sensing portion 53a acts as a conductive bus for a wiper 96 to be described. The remaining sensing portions 53b,53c,53d,53e,53f have at least one, preferably a plurality of conductive elements or segments 54, for example thirty-one (31), of various values strategically located or spaced along each sensing portion 53b,53c,53d, 53e,53f. For example, the conductive segments 54 have binary values of 16,8,4,2,1, along sensing portions 53b,53c, 53d,53e,53f, respectively. It should be appreciated that the output is binary. It should be appreciated that the conductive ink (digital switching pads/contact strips) could be overlapped to permit digital switching without signal loss or interference. It should also be appreciated that linear or non-linear requirements of the card portion 50 could easily be determined and laid out for specific applications.

The digital sensor 48 is disposed in the chamber 34 of the sensor housing 28 and abuts the support wall 40. The digital sensor 48 is connected by suitable means such as wires 55 to the conductive fuel level portion 52 and the electrical connector 18. The wires 55 are press-fit into recesses 55a in the side wall 32 of the sensor housing 28 to support the digital sensor 48 in the chamber 34. It should be appreciated that by changing the layout of the conductive ink of the digital sensor 48, the digital sensor 48 may be enhanced for greater resolution and flexibility to accommodate customer needs. It should also be appreciated that the output may be left as a binary output for direct connection to a controller (not shown) of the vehicle or a simple resistor/digital binary to analogue decoder could be implemented into the circuit to create an analogue output.

The digital signal fuel sensor 10 further includes a wiper assembly, generally indicated at 56, to cooperate with the digital sensor 48 to provide a signal as to a level of fuel in the fuel tank 12. The wiper assembly 56 includes a wiper housing 58 movable relative to the sensor housing 28. The wiper housing 58 has a base portion 60 with a generally cylindrical shape and a generally circular cross-section. The base portion 60 extends axially and has a cavity 62 in one end thereof. The base portion 60 also includes an aperture 64 extending axially therethrough and communicating with the cavity 62. The base portion 60 is disposed in the cavity 44 of the sensor housing 28 for rotation therein.

The wiper housing 58 also 42 includes a float arm portion 66 extending radially from the base portion 60. The float arm portion 66 has a base wall 68 and at least one, preferably a plurality of pairs of laterally spaced tabs 70 extending generally perpendicular to the base wall 68 for a function to be described.

The wiper housing 58 further includes a wiper portion 72 extending radially from the base portion 60 opposite the float arm portion 66. The wiper portion 72 is generally rectangular in shape and has a cavity 74 therein. The wiper portion 72 includes an aperture (not shown) extending therethrough to allow communication with the cavity 74 and form a seat (not shown) for a function to be described. The wiper housing 58 is formed from a plastic material. It should be appreciated that the wiper housing 58 is formed as a monolithic structure being integral, unitary and one-piece.

The wiper assembly 56 also includes a bushing 80 disposed in the cavity 62 of the base portion 60. The bushing 80 is generally cylindrical in shape and has a shaft 82 extending axially through the aperture 64 if the base portion 60. The shaft 82 has a diameter less than a diameter of a remainder of the bushing 80 and extends through the aperture 46 of the cavity 44 of the sensor housing 28. The shaft 82 has a groove 84 extending circumferentially about one end to receive a retainer (not shown) to prevent the shaft 82 from exiting the aperture 46 of the sensor housing 28. The bushing 80 has a cavity 86 in the end opposite the shaft 82 and an aperture 88 extending through the cavity 86 and shaft 82 for a function to be described. The bushing 80 is made of a plastic material and formed as a monolithic structure being integral, unitary and one-piece. It should be appreciated that the bushing 80 is conventional and known in the art.

The wiper assembly 56 includes a float 90 and a float arm 92 connected to the wiper housing 58. The float 90 is generally rectangular in shape and has a cavity 94 in one end. The float 90 is made of a floatable material having a density less than a density of the fuel. The float arm 92 is a rod that is bent with one end disposed in the cavity 94 of the float 90 and another end disposed in the aperture 88 of the bushing 80. The float arm 92 is also disposed between the tabs 70 of the float arm portion 66 of the wiper housing 58 and retained therein. The float arm 92 is made of a metal material. It should be appreciated that the float 90 and float arm 92 are conventional and known in the art. It should also be appreciated that the wiper assembly 56 acts as a rheostat.

Referring to FIG. 2, the wiper assembly 56 includes a wiper 96 for cooperating with the digital sensor 48. The wiper 96 has a base 98 that is generally rectangular in shape. The wiper 96 also has at least one, preferably a plurality of contact flex arms 100 formed by slots 102 spaced laterally and extending longitudinally in the base 98. The contact flex arms 100 extend longitudinally and downward at an angle from the base 98. The wiper 96 also includes at least one, preferably a plurality of or multiple contacts (not shown) near a free end of each contact flex arm 100. The contact flex arms 100 and base 98 are formed from a metal such as copper. The contact flex arms 100 and base 98 are integral, unitary and formed as one-piece. The base 98 is disposed in the cavity 74 of the wiper portion 72 of the wiper housing 58 adjacent the seat such that the contact flex arms 100 extend through the aperture toward the variable resistor 48. The wiper 96 is insert molded into the wiper portion 72 of the wiper housing 58 to retain the wiper 96 thereto. It should be appreciated that the contact flex arms 100 flex or deflect relative to the base 98.

In operation, the digital signal fuel sensor 10 is operatively connected to the fuel reservoir 22 of the fuel delivery module 14 inside the fuel tank 12. Fuel inside the fuel tank 12 causes the float 90 to rise to the top thereof. The wiper 96 engages the conductive portion 52 of the digital sensor 48. The contacts of the contact flex arms 100 engage the conductive ink so that as the float 90 moves, it causes the positive pole of the current source to be effectively located at different locations of the sensing portions 53a,53b,53c, 53d,53e,53f which include the conductive segments 54 to produce the binary output. Binary representation of the discrete voltage values are obtainable for each position of the contact flex arm 100 to provide an electrical signal which is sent to a controller (not shown) via the electrical connector 18 to indicate the level of fuel in the fuel tank 12. As the fuel level increases or decreases in the fuel tank 12, the float 90 is raised or lowered to rotate the wiper housing 56 relative to the sensor housing 28 via the float arm 92. As the wiper housing 56 rotates, the wiper 96 rotates across the conductive fuel level portion 52 and the contacts move to different locations of the sensing portions 53a,53b,53c,53d,53e,53f to vary or provide a different binary signal to indicate the level of fuel in the fuel tank 12. It should be appreciated that the digital signal fuel sensor 10 incorporates digital switching, which is not sensitive to electrical noise as it is represented as a zero (signal low) or a one (signal high), and an electrical signal present in any form with or without noise will be represented as a one (signal high).

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A digital signal fuel sensor comprising:

a digital sensor;

a wiper assembly for rotation relative to said digital sensor;

said digital sensor having a plurality of sensing portions having at least one conductive segment thereon forming a fuel level portion; and said wiper assembly including a plurality of contact arms extending toward said digital sensor for contacting said sensing portions of said digital sensor as said wiper assembly rotates to produce a binary output.

2. A digital signal fuel sensor as set forth in claim 1 wherein said sensing portions are made of a conductive ink.

3. A digital signal fuel sensor as set forth in claim 2 wherein said sensing portions have predetermined binary outputs.

4. A digital signal fuel sensor as set forth in claim 3 wherein an outermost one of said sensing portions acts as a conductive bus for said wiper assembly.

5. A digital signal fuel sensor as set forth in claim 4 wherein a remainder of said sensing portions have a plurality of conductive segments.

6. A digital signal fuel sensor as set forth in claim 1 wherein said sensing portions are arcuate shaped.

7. A digital signal fuel sensor as set forth in claim 1 wherein said sensing portions are concentric.

8. A digital signal fuel sensor as set forth in claim 1 wherein said at least one segment has a binary value.

9. A digital signal fuel sensor as set forth in claim 1 wherein said wiper assembly includes a plurality of contact flex arms spaced laterally and extending longitudinally and downwardly toward said digital sensor.

10. A digital signal fuel sensor as set forth in claim 1 wherein said digital sensor comprises a card portion and a conductive ink forming said sensing portions disposed on said card portion.

11. A digital signal fuel sensor as set forth in claim 10 wherein said card portion is made of a ceramic material.

12. A digital signal fuel sensor for a fuel tank comprising:

a sensor housing operatively connected to a fuel tank;

a digital sensor operatively connected to said sensor housing and having a plurality of arcuate shaped concentric sensing portions having at least one conductive segment thereon forming a fuel level portion; and a wiper assembly operatively connected to said sensor housing for rotation relative to said digital sensor and including a wiper with a plurality of contact arms for contacting said fuel level portion as said wiper assembly rotates to produce a binary output.

13. A digital signal fuel sensor as set forth in claim 12 wherein said at least one segment has a binary value.

14. A digital signal fuel sensor as set forth in claim 13 wherein an outermost one of said sensing portions acts as a conductive bus for said wiper assembly.

15. A digital signal fuel sensor as set forth in claim 14 wherein a remainder of said sensing portions have a plurality of conductive segments.

16. A digital signal fuel sensor as set forth in claim 12 wherein said digital sensor comprises a card portion and a conductive ink forming said sensing portions disposed on said card portion.

17. A digital signal fuel sensor as set forth in claim 16 wherein said card portion is made of a ceramic material.

18. A digital signal fuel sensor as set forth in claim 12 wherein said wiper assembly includes a plurality of contact flex arms spaced laterally and extending longitudinally and downwardly toward said digital sensor.

19. A digital signal fuel sensor as set forth in claim 12 wherein said wiper assembly comprises a wiper housing, a bushing connecting said wiper housing to said sensor housing, a float arm connected to said wiper housing and a float connected to said float arm such that said float moves said float arm and said wiper housing relative to said digital sensor as a level of fuel increases and decreases in the fuel tank.

20. A digital signal fuel sensor for a fuel tank comprising:

a sensor housing operatively connected to a fuel tank;

a digital sensor operatively connected to said sensor housing and having a plurality of arcuate shaped concentric sensing portions having at least one conductive segment thereon forming a fuel level portion; and a wiper assembly for rotation relative to said digital sensor and comprising a wiper housing, a bushing connecting said wiper housing to said sensor housing, a float arm connected to said wiper housing, a float connected to said float arm, and a wiper comprising a base connected to said wiper housing, a plurality of contact flex arms extending from said base toward said fuel level portion of said digital sensor for contacting said fuel level portion of said digital sensor to provide a binary output to indicate a level of fuel in a fuel tank.

* * * * *